Sept. 1, 1959 K. HENRICHSEN 2,901,979
HYDRAULIC UNIT WITH IMPROVED PISTON ASSEMBLY
Filed July 24, 1953 3 Sheets-Sheet 1
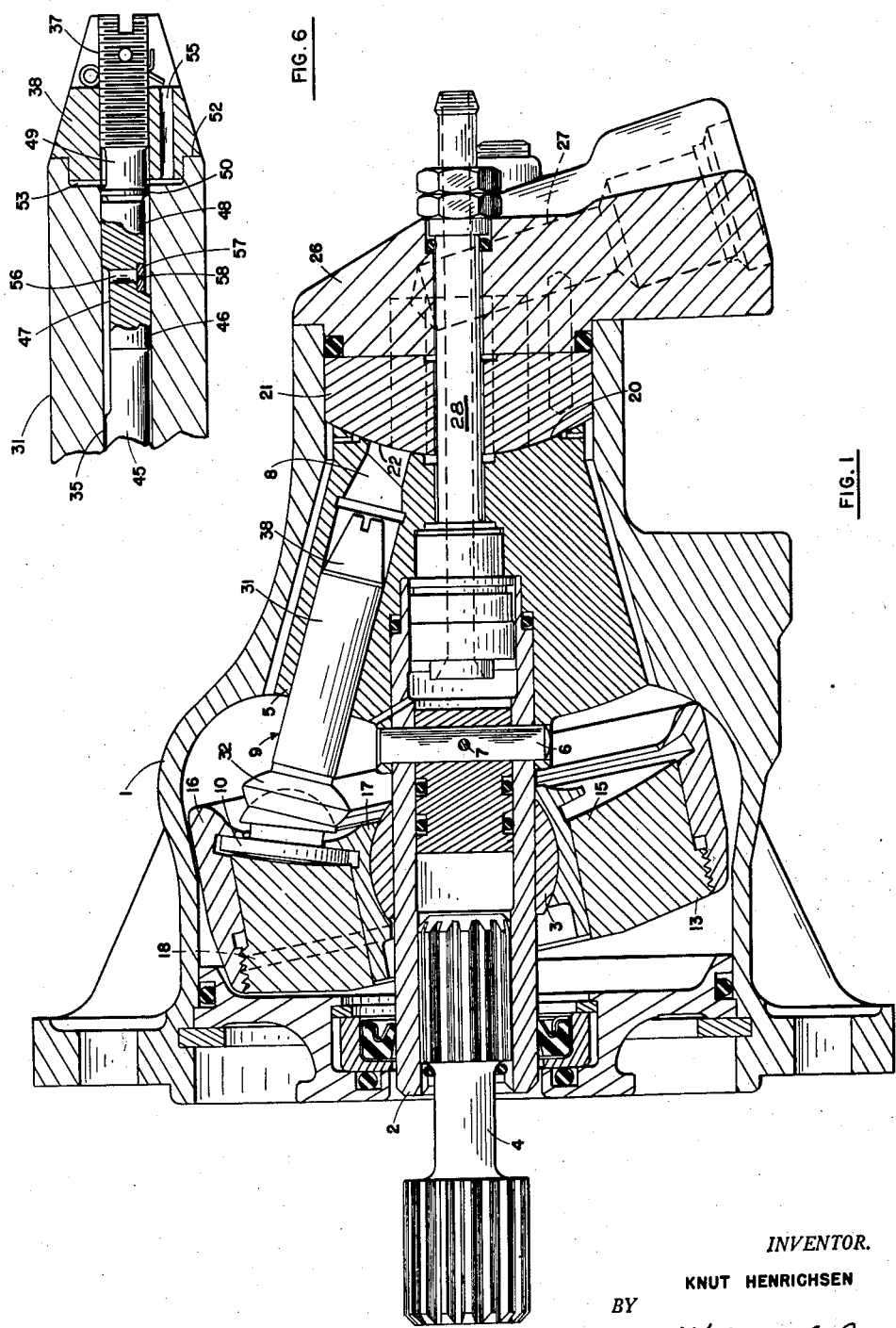
INVENTOR.
KNUT HENRICHSEN
BY
*William L. Lane*
ATTORNEY Sept. 1, 1959 K. HENRICHSEN 2,901,979
HYDRAULIC UNIT WITH IMPROVED PISTON ASSEMBLY
Filed July 24, 1953 3 Sheets-Sheet 2

INVENTOR.
KNUT HENRICHSEN
BY
*William R. Lane*
ATTORNEY

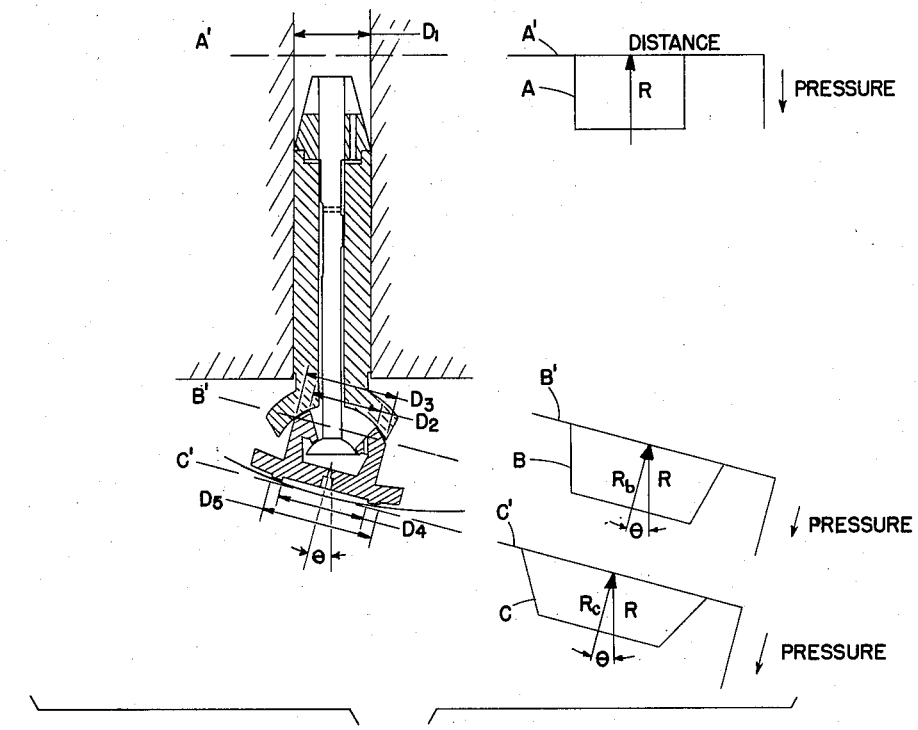
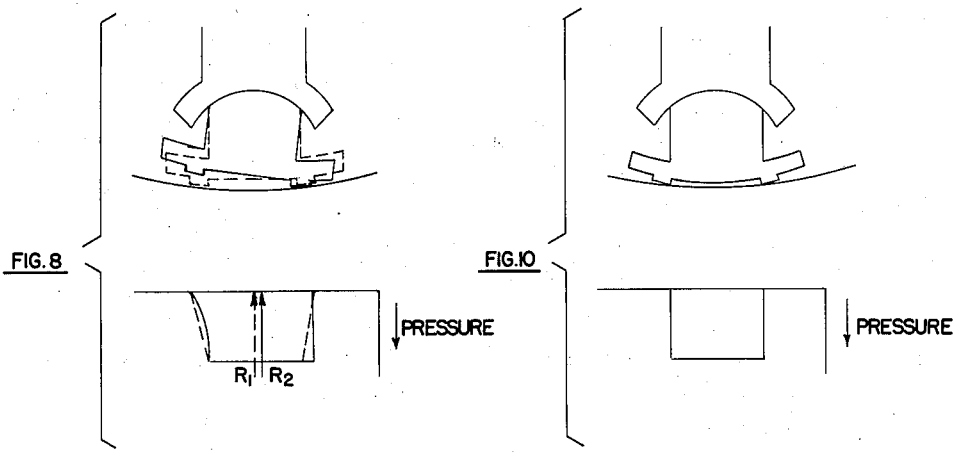
FIG. 9
FIG. 8    FIG. 10

United States Patent Office 2,901,979
Patented Sept. 1, 1959

2,901,979
HYDRAULIC UNIT WITH IMPROVED PISTON ASSEMBLY

Knut Henrichsen, Los Angeles, Calif., assignor to North American Aviation, Inc.

Application July 24, 1953, Serial No. 370,031

6 Claims. (Cl. 103—162)

This invention pertains to an improved hydraulic pump or motor of the swash plate type. Such a hydraulic unit is described in my Patent No. 2,721,519, issued October 25, 1955 for Fuid Energy Transfer Device.

It has long been a problem for pump or motor units of the swash plate type to provide adequate lubrication between the various moving parts so that there will be no metal to metal contact and thus little friction or wear. Various schemes have been proposed to correct such conditions, some of them being satisfactory only for certain speeds of rotation and others being of a very complex construction. This invention represents an improved design wherein adequate lubrication is at all times maintained.

Therefore it is an object of this invention to provide a hydraulic unit having adequate lubrication for the moving parts.

Another object of this invention is to provide a hydraulic unit wherein there is adquate lubrication of the swash plate and slipper of the piston assembly.

A further object of this invention is to provide a hydraulic unit having a piston assembly with controlled lubrication of both bearing faces of the slipper of the assembly.

A still further object of this invention is to provide a hydraulic pump unit in which the piston assembly utilizes two metering orifices.

Yet another object of this invention is to provide a hydraulic unit wherein the lubrication is adequate over a wide range of operational speeds.

Figure 5:
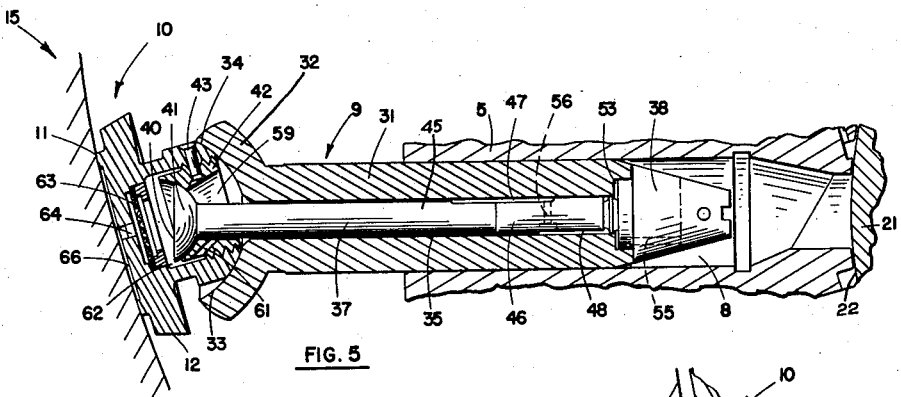
Figure 4:
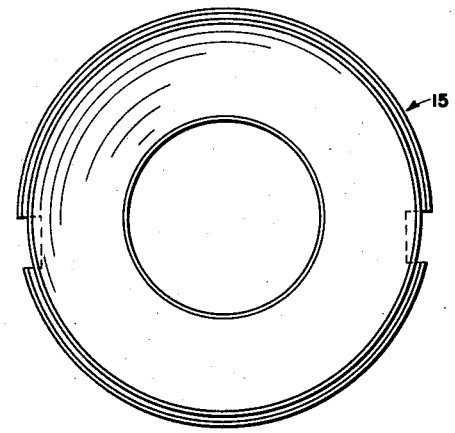
Figure 7:
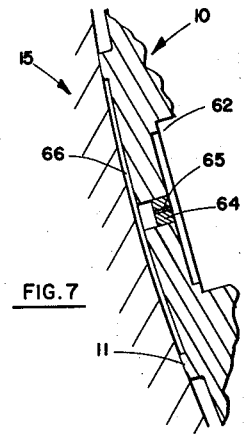
Figure 3:
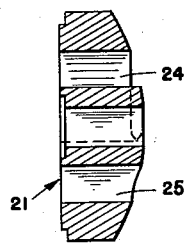
Figure 2:
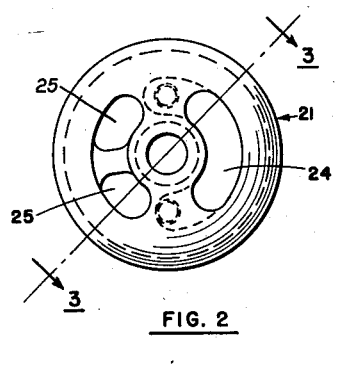

These and other objects will become apparent from the following detailed description taken in connection with the accompanying drawings in which Fig. 1 is a sectional view of the pump of this invention, Fig. 2 is an elevational view of the valve plate, Fig. 3 is a sectional view taken along line 3—3 of Fig. 2, Fig. 4 is an elevational view of the slipper race, Fig. 5 is a sectional view of the piston assembly, Fig. 6 is an enlarged fragmentary sectional view of a portion of the piston member, Fig. 7 is an enlarged fragmentary sectional view of a portion of the slipper, Fig. 8 is a schematic view of the slipper at an angle to the swash plate, Fig. 9 is a schematic view of the pressure distribution, and Fig. 10 is a schematic view of a warped slipper.

With reference to the drawings, the device comprises a housing 1 in which shaft 2 is rotatably mounted on a suitable bearing member 3. Shaft 2 is hollow and may be internally splined at one end for engagement with spline shaft 4 which will drive the unit when used as a pump, or may serve as the power takeoff when the unit is used as a motor. Mounted on shaft 2 is a cylinder block 5 which is secured to the shaft and rotatable therewith by means of pin 6 extending through block 5 and shaft 2 and held in place by rivet 7. Cylinder block 5 is provided with a plurality of cylinders or bores 8 arranged preferably in a conical manner. Piston assemblies denoted generally by the numeral 9 are reciprocal within the cylinders. Each piston assembly is provided with a slipper bearing member 10 pivotally engaging the outer end of the piston. The slipper bearing members, constructed of bronze or other suitable bearing material, include bearing surface 11 and peripheral portions 12. A swash plate assembly 13 is suitably secured within the housing at an angle other than 90° relative to the axis cylinder block 5. The pump may be of fixed displacement wherein the swash plate is stationary, or provision may be made for varying the angle of the swash plate and thus the pump displacement. The swash plate assembly includes a slipper race 15 which is engaged by bearing surfaces 11 of slipper bearing members 10. An outer retainer 16 is secured to the periphery of slipper race 15 in a suitable manner such as by screw threads, and an inner retainer 17 may be secured to the inner edge of the slipper race by pin 18. These retainers engage peripheral portions 12 of slipper bearing members 10 and serve to effect a positive return of the slipper and piston means when the unit is rotating at low speed. During high speed operation the conical arrangement of the cylinders will cause the piston means to return by centrifugal force alone.

It may be seen that spline shaft 4, shaft 2, and cylinder block 5 will rotate together within the housing, thus causing a rotation of the cylinder 8 and the piston means 9 therein so that the swash plate 13 will cooperate with the slipper bearings 10 to impart a reciprocal motion to the piston means. When the unit is used as a motor the driving force will come from the piston means and will rotate spline shaft 4 while use of the unit as a pump will require a source of power (not shown) connected with spline shaft 4 for rotating cylinder block 5 causing reciprocation of the pistons.

The end 20 of cylinder block 5, away from swash plate 13, is in bearing relationship with stationary valve block or plate 21. Surface 20 of cylinder block 5, and surface 22 of valve block 21, have complementary spherical curved surfaces, which will permit use of a freely floating cylinder block mounted on the single bearing member 3.

Referring now to Figs. 2 and 3, it may be seen that valve block 21 includes inlet port 24 and outlet ports 25 extending therethrough. Port block 26 includes an inlet (not shown) and outlet 27 in communication with ports 24 and 25 respectively. Thus fluid may enter the inlet in port block 26, flow through inlet port 24 of valve block 21, and from there into a cylinder 8 when the piston means is on the inlet stroke away from the valve block. Similarly, fluid may exhaust from the cylinder on the return stroke of the piston means through port 25 and outlet 27. A fixed axle member 28 projects into the housing and maintains the cylinder block in engagement with the valve block.

To prevent wear and lessen friction losses it is necessary, of course, to provide lubrication for bearing surface 11 of slipper member 10 and also for the opposite surface of the slipper member which engages the piston. In order to accomplish this the piston assembly is constructed in the manner best illustrated in Fig. 5. Piston assembly 9 includes an elongated cylindrical portion 31 which terminates in an enlarged end 32 which projects beyond the cylinder bore. Portion 31 is reciprocal within the cylinder bore and closely fitted relative thereto. Outer face 33 of the piston member is spherically concave and adapted to engage a complementary face 34 of the slipper member. In this manner the slipper member is made pivotal relative to the piston and yet is always in engagement therewith due to the complementary shapes of faces 33 and 34 of the two members. The piston member is provided with a hollow bore 35 extending axially therethrough and a rod 37 is received therein. This rod is threaded on one end whereby that end is held to the piston assembly by means of a nut 38 which engages the end of the piston. The opposite end of rod 37 is provided with an enlarged head 40 which has a spherically rounded under surface 41. This surface of head 40 engages a complementary surface of nut 42 which is threadably received in the slipper so that when assembled it constitutes a portion thereof. Rivet 43 prevents relative rotation between nut 42 and the remaining portions of the slipper. In this manner the slipper 10 is pivotally held to the end of piston 31 by means of rod 37 and nut 38.

Rod 37 has a generally rounded exterior contour but its dimensions are not constant throughout its length. Thus portion 45 thereof is of a relatively small diameter leaving considerable clearance between the rod and the walls of bore 35. Portion 46 of rod 37 is of a larger exterior diameter fitting as closely as possible within the bore so as to leave practically no clearance. The rod is also flattened as at 47 and 48 while portion 49 is again of a decreased diameter having a relatively narrow enlarged portion 50. This latter portion is of slightly lesser diameter than portion 46. Nut 38 engages the end of piston 31 at projecting shoulder 52 whereby the interior portion of the nut leaves a clearance 53 communicating with bore 35. Passageway 55 is provided in the nut so that there is thereby an opening from the interior of the cylinder bore through this passage, and through clearance space 53, to the bore within the piston.

In the portion of rod 37 within the piston an opening 56 is provided extending radially through the rod. Within this opening is disposed an orifice member 57 having a restricted opening 58 therethrough of a predetermined size as shown in the enlarged view of Fig. 6. This orifice will permit fluid flow through aperture 56 but will assure that such flow is carefully metered and controlled. For a 3,000 p.s.i. pump an orifice of 0.3 mm. has been found to be satisfactory. Thus when the pump or motor is in operation the pressure of the fluid within the cylinder will force some of this fluid through aperture 55 and into bore 35 of the piston. This fluid is directed by bore 35 and the rod so that it passes through metering orifice 58, whereby the fluid flow through the piston is controlled. Portion 50 of rod 37 is critical in dimension in that it is devised to provide a clearance with the wall of the interior of the bore which is slightly less than the diameter of the opening of the metering orifice. This leaves a sufficient area so that the fluid flow is not appreciably throttled thereby, but the close clearance will preclude passage of particles which might clog up orifice 58.

Slipper 10 is flattened on the end thereof which engages the end of the piston, and also relieved within the interior of the nut portion, so as to leave a recess 59 which receives the fluid which has flowed through the interior of the piston. End face 34 of the slipper thereby defines an annular dam surrounding central recess 59. The fluid which is received within this recess is divided into two portions at the slipper. Some of the fluid will flow outwardly across the dam formed by face 34, and into the case of the pump. This fluid will provide a fluid film lubricating the matching faces of the slipper and piston as the slipper wobbles relative to the piston when the pump is in operation. An additional quantity of fluid will flow through opening 61 into hollow interior portion 62 of the slipper. A screen 63 is within this hollow interior, and beyond the screen is a second orifice member 64 having a restricted opening 65 of predetermined size as shown in Fig. 7. An orifice of 0.2 mm. diameter has been successfully used for this purpose. Orifice member 64 will precisely meter the flow of fluid passing through the hollow interior of the slipper just as orifice 57 metered the total flow into the piston. By metering the flow through the slipper, orifice 64 automatically determines the amount of fluid which will flow across the dam provided by face 34. Screen 63 is of a mesh which is fine enough to preclude the passage of particles of a size which would clog up opening 65, but otherwise does not offer appreciable restriction to fluid flow.

The fluid which has been permitted to pass through the interior of the slipper will flow outwardly through recessed portion 66 in the outer surface of the slipper and from thence across the annular dam provided by bearing surface 11, to the interior of the pump case. The fluid across this dam will of course provide lubrication whereby metal-to-metal contact between the slipper and the swash plate may be prevented. It is obvious thus far that by the use of two orifices in this piston assembly the total flow into the piston is controlled and the amount of this flow which is used to lubricate the various bearing surfaces is also controlled.

The reason for providing two metering orifices in the piston assembly of this invention is to maintain at all times a fluid film between the mating surfaces of the slipper and the piston as well as between the slipper and the swash plate. This is not because the friction between the slipper and the piston is of major consequence in the pump losses, but arises from the fact that the slipper must be maintained in proper relationship with the swash plate to avoid metal-to-metal contact, severe wear and high friction at that point. An examination of the schematic illustration of Fig. 8 will make the reasons for this controlled fluid film more apparent. Obviously as the cylinder block rotates relative to the swash plate the slippers will because to rock or pivot relative to the piston. This is so that the slippers will be maintained in engagement with the swash plate, and also with the pistons which reciprocate in a fixed path defined by the cylinder bores, this path being at an angle to the swash plate. Resisting this rocking action of the slippers is the friction between the slipper and the piston. As can be seen in Fig. 8 fluid from the cylinder passing through the piston assembly will build up a pressure beneath the slipper between the slipper and the swash plate. The net pressure tending to force the slipper and the swash plate apart will act upon the projected area of the engaging surfaces. The pressure distribution curve will take a form, in normal operation wherein the slipper is in proper alignment with the surface of the swash plate, such as that illustrated by the broken lines in the graph. This pressure will be constant across recess 66 in the slipper face to the inner edge of the dam, and will drop off approximately linearly across the dam to the outer edge thereof where pump case pressure is maintained, this pressure being practically zero. The resultant $R_1$ of the pressure passes through the center of face 34. If the slipper should become displaced at an angle relative to the surface of the swash plate, such as to the position shown in solid lines in this figure, the pressure distribution between the slipper and the swash plate will then be defined by the curve enclosed by solid lines in the graph. This is because the right hand edge of the slipper dam is then adjacent the swash plate while the inner edge thereof clears the swash plate by a relatively large amount. The resultant $R_2$ of this pressure is therefore shifted slightly off center, as illustrated, thereby exerting a moment tending to right the slipper. It can be seen that this righting moment actually is very small and will not be able to overcome an appreciable friction between the slipper and the piston. The frictional force of metal-to-metal contact at the piston is greater than the righting force can overcome. If the slipper is not righted, however, metal-to-metal contact will result between the slipper and the swash plate causing large friction losses and severe wear. It is absolutely necessary, therefore, that the friction between the slipper and the piston be maintained at a minimum value, which means that it is essential to meter and control fluid flow between the slipper and the piston in order to maintain a constant fluid film at this location.

Certain other considerations are critical in the proper construction and operation of this piston assembly, which features may be seen by reference to the schematic illustration of Fig. 9. Graphs A, B, and C represent the pressure distribution of the net pressure at various locations within the pump, marked correspondingly with the designation A', B' and C'. Thus within the cylinder at A' the downward pressure on the end of the piston will be represented by a rectangular area A, this area being constant across the projected area of the piston head. A reaction force R equal in magnitude to the resultant of pressure curve A is exerted by the piston. At B' where the slipper engages the end of the piston the pressure distribution will be as shown in graph B, being substantially constant across the recessed portion 59 of the slipper but dropping off approximately linearly to the edge of the dam. The maximum pressure at B', which is that across the recess, will naturally be less than the pressure within the cylinder due to the fact that the fluid has lost pressure in passing through the piston. A resultant force $R_b$ is the equivalent in magnitude to the resultant of curve B. At C' a pressure distribution which is similar in shape to that at B' is produced, being constant across the recess and dropping off across the dam to approximately pump case pressure which is substantially zero. The resultant force of the pressure at C' equals the vector $R_c$. Again the maximum pressure at C' will be less than the maximum pressure at B' due to the pressure loss through orifice 64.

In order to attain a stable condition wherein the slipper is lifted off the end of the piston by a fluid film it is necessary to exert a force between the slipper and the piston substantially equal to that exerted on the end of the piston forcing the piston into engagement with the slipper. This must be attained regardless of the fact that the maximum pressure at B' is less than the maximum pressure at A'. Furthermore, for a swash plate type of pump the swash plate itself is disposed at an angle relative to the axes of the cylinders so that pumping action can take place. The slippers are parallel to the surface of the swash plate, whereby a line normal to that surface will extend through the center line of the slipper, making an angle theta with the axis of a cylinder. The pressure exerted on the faces of the slipper is in the direction of this normal line, as is the resultant of the pressure. Thus at the slipper bearing faces the pressure areas which can be used to oppose the pressure within the cylinder are the actual areas involved as projected on a plane perpendicular to the axis of the cylinder. In order that the forces will balance so that the resultant force at B' will be substantially equal to that at A', the total force at B', which is $R_b$, multiplied by the cosine of the angle theta, must produce a resultant R equal to the resultant R at A'. In other words at B' there must be produced a total resultant force $R_b$ which is great enough to produce a component R in the direction of the axis of the cylinder which is equal to the total reacting force at A'. A larger force can be achieved at B' by providing a larger pressure area at this location. In other words, curve B should be made wider so as to define a greater area than that of higher curve A. Since the drop off in pressure across the dam is approximately linear it may be stated that the average dam diameter at B', $$\frac{D2+D3}{2}$$

must be greater than the diameter of the cylinder D1. It is proper to refer to the pressure in terms of the diameters involved because, of course, the area varies with the diameter.

Likewise it is necessary that the force at C' is substantially the same as that at B' so that the slipper will always lift off of the swash plate and a fluid film may be maintained between those two surfaces. The condition at C' is of course similar to the condition at B' in regard to the resultant forces produced. It must be true that $R_c$ times the cosine of theta is substantially equal to R, which is the reacting force in the direction of the axis of the cylinder, in order that a balance in the direction of that axis will be obtained. For this reason the average diameter at C', which is $$\frac{D4+D5}{2}$$

must exceed the average diameter at B', $$\frac{D2+D3}{2}$$

Therefore it may be stated that the pressure area between the slipper and the swash plate must exceed the pressure area between the slipper and the piston, and this latter pressure area must exceed the pressure area of the cylinder bore. Or it may be said that $$\frac{D4+D5}{2}$$

must be greater than $$\frac{D2+D3}{2}$$

which must be greater than D1.

There is yet another consideration which should be taken into account in providing a pump or motor that will operate satisfactorily under all conditions. It may occur that, due to warpage or wear, the dam surfaces will become angularly displaced relative to their mating bearing surfaces. This condition is shown schematically and exaggerated in Fig. 10. Thus the dam of surface 11, due to warpage of the slipper or swash plate, is shown to be no longer complementary to the face of the swash plate. The extreme condition is shown in this figure wherein the inner edge of the dam contacts the swash plate so that there is no leakage past the dam. The pressured istribution at C' for such a condition is shown by the rectangular graph wherein it can be seen the pressure is constant across the recess in the surface of the slipper, but drops off immediately to pump case pressure at the boundary of the recess where the dam begins. This is because the large clearance at the outer diameter of the dam causes all of the pressure drop across the dam to occur at the dam's inner edge which remains close to the swash plate. When this is the case, there is substantially no pressure exerted normal to the dam surface so that some of the force for lifting the slipper from the swash plate is lost. The area under the curve of Fig. 10 is thus smaller than the area under curve C of Fig. 9. For warpage at B' where the slipper engages the piston a similar rectangular curve will define the pressure distribution. Despite this it is of course quite necessary that the force between the slipper and the swash plate be sufficient to raise the slipper off of the swash plate so that a fluid film may be maintained, and likewise the force between the slipper and the piston must assure that a fluid film is maintained at this point. If, for example, warpage should occur at the swash plate and not at the piston there will be a minimum resultant force at C' tending to lift the slipper from the swash plate to provide a fluid film. At the same time at B' with no warpage the resultant force urging the slipper against the swash plate will be undiminished. Therefore it is necessary for the pressure area defined by the interior of the dam at C' to exceed the pressure area defined by the average diameter of the dam at B' in order that a sufficient force can always be maintained at the swash plate. Stated another way, D4 must be greater than $$\frac{D2+D3}{2}$$

Similarly, the pressure area defined by the interior of the dam at B' must be greater than the pressure area of the piston head. This will permit a force between the piston and the slipper sufficient to maintain a fluid film for all conditions. Thus D2 must be greater than D1.

For the piston assembly it can therefore be stated that the pressure area defined by the interior of the dam at the swash plate must be greater than the pressure area defined by the average diameter of the dam at the piston. Also the pressure area of the interior of the dam at the piston must exceed that defined by the piston head in the cylinder. The effective pressure area between the slipper and the piston, due to the angularity of these two parts, is equal to the actual area at the interior of dam 34 as projected on a plane perpendicular to the cylinder bore. In other words, D4 should be greater than $$\frac{D2+D3}{2}$$

and D2 should be larger than D1.

Other considerations are also important in the design of the best possible piston assembly. It is important that the volumes of the recesses be kept at a minimum so that the pressure at the various bearing surfaces will be built up as quickly as possible when forces are exerted on the piston. The hydraulic fluid is slightly compressible which means that if the volume of this fluid within the piston assembly is large when forces are exerted on the piston there will be first a compression of the fluid within the piston before a steady state of flow through the piston passageway is obtained. If the fluid volume is sufficiently large the compression of the fluid can cause metal-to-metal contact at the bearing surfaces.

This invention, therefore, provides a hydraulic pump or motor unit with an improved piston assembly which is of simplified yet efficient design. By attaining controlled fluid film thickness at both bearing faces of the slipper, metal-to-metal contact at the swash plate is prevented. The unit will be stable and will automatically compensate for all extreme operating conditions.

The foregoing detailed description is to be clearly understood as given by way of illustration and example only, the spirit and scope of this invention being limited only by the appended claims.

I claim:
1. A piston assembly for a pump having a swash plate and a cylinder block rotatable relative thereto and provided with a cylinder bore therein, said piston assembly comprising a piston member reciprocally engaging said cylinder block in said bore, said piston member having an end remote from said bore and being provided with a flow passage therethrough whereby fluid from said cylinder bore is flowable through said piston member; a fluid metering means controlling the rate of fluid flow to said passageway from said cylinder bore; a slipper having a bearing face engaging said end of said piston with a recess in said bearing face adapted to receive said fluid, said bearing face thereby defining a pressure area against which said fluid reacts, said area being greater than the pressure area of said piston in said cylinder bore, said slipper having a metering flow passage therethrough and having a second bearing face adapted to engage said swash plate and receive fluid flow through said slipper passage, said second bearing face thereby defining a pressure area against which said fluid reacts, said area of said second bearing face being greater than said area of said firstly mentioned bearing face whereby said metering flow passages cooperate to maintain a fluid film on said bearing faces.

2. A hydraulic pump or motor comprising a housing; a fixed valve plate having fluid distributing ports therein; a cylinder block rotatably mounted in said housing in bearing relationship with said valve plate, said block having cylinder bores therein; and a piston assembly in each of said bores, each of said assemblies comprising a piston member reciprocally received within a cylinder bore and having an enlarged end portion remote therefrom; a slipper, said slipper having a first bearing face for engagement with said end of said piston and a second bearing face for engagement with said swash plate, each of said faces being provided with a recess therein whereby each face forms a dam around its recess, said piston having a passageway therein providing communication from said cylinder to said recess in said first face, said slipper having a passageway therein providing communication from said recess in said first face to said recess in said second face whereby fluid from said cylinder bore can flow through said piston assembly, orifice metering means in said piston passageway for controlling the rate of flow through said assembly, and orifice metering means in said slipper passageway for controlling the rate of flow through said slipper, the projected area of the recess in said second face being greater than the projected area of the recess in said first face, the latter projected area being greater than the projected area of said piston in said bore whereby a fluid film is maintainable on said bearing faces by means of fluid from said cylinder bore.

3. A piston assembly for a pump having a swash plate and a cylinder block rotatable relative thereto and provided with a cylinder bore therein, said piston assembly comprising a piston member reciprocally engaging said cylinder block in said bore, said piston member having an enlarged end face remote from said cylinder bore; a slipper member engaging said end of said piston on one face thereof and said swash plate on the opposite face thereof, said slipper faces having recessed portions therein whereby said faces define dams for providing said engagement, said piston having a passage therethrough whereby fluid from said cylinder bore is flowable into the recess in said first face, said slipper member having a passage therethrough whereby fluid is flowable from said recess in said first face to said recess in said second face, said faces thereby defining pressure areas against which said fluid acts, the pressure area of said second face being greater than the pressure area of said first face, and the pressure area of said first face being greater than the pressure area of the piston within the cylinder bore, and orifice metering means in said passages for controlling and proportioning the rate of flow through said piston assembly to said pressure areas thereby to control the force exerted on said pressure areas.

4. A piston assembly for a pump having a swash plate, a cylinder block rotatable relative thereto and having a cylinder bore therein, said piston assembly comprising a piston member reciprocally engaging said cylinder block in said bore, said piston having an enlarged spherical end face projecting from said cylinder bore; a slipper, said slipper having a first face adapted to complementarily engage said end face, said first face having a recess defined by an annular dam around said recess, the average lateral dimension of said dam being greater than the lateral dimension of said piston member, said slipper having a second face oppositely disposed from said first face and adapted to complementarily engage said swash plate, said second face having a recess therein of greater lateral dimension than said lateral dimension of said recess in said first face, said second face thereby providing an annular dam, the average lateral dimension of said dam in said second face being greater than the average lateral dimension of said dam in said first face; rod means interconnecting said slipper and said piston whereby said slipper is pivotal relative to said piston, said piston and said slipper each being provided with an aperture therethrough whereby lubricating fluid flows from said cylinder through said piston to said recess in said first face, and through said slipper to said recess in said second face; orifice metering means in said piston controlling the rate of fluid flow in said piston aperture, and orifice metering means in said slipper for controlling the rate of flow through said slipper passage.

5. A piston assembly for a pump having a swash plate and a cylinder block rotatable relative thereto, said cylinder block being provided with a cylinder bore therein, said device comprising a piston member having an elongated portion reciprocally engaging said cylinder block within said cylinder bore, said piston member having an axial opening therethrough and an end remote from said cylinder block; a slipper, said slipper having a central opening therethrough; a rod in said piston opening and projecting therefrom into said slipper opening, said rod having a clearance fit within said piston opening providing a fluid passageway therearound and further having an end slidably engaging said slipper around said opening whereby said rod holds said slipper to said piston, said slipper being provided with an annular bearing surface for complementarily engaging said end of said piston whereby said slipper is pivotal relative thereto, the average lateral diameter of said annular bearing surface being greater than the diameter of said elongated portion of said piston member, said slipper having an oppositely disposed annular bearing surface complementarily engaging said swash plate, said oppositely disposed annular bearing surface thereby defining a recess of greater diameter than the average diameter of said firstly mentioned bearing surface whereby lubricating fluid flows through said piston for lubricating said first annular bearing surface, and flows through said opening in said slipper for lubricating said second annular bearing surface; metering orifice means in said piston opening for controlling the rate of fluid flow to said fluid passageway; and metering orifice means in said slipper opening for controlling the rate of flow through said slipper whereby the pressures on said slipper are controlled.

6. A piston assembly for a pump having a swash plate and a cylinder block rotatable relative thereto, said cylinder block having a bore therein, said piston assembly comprising a piston member reciprocally engaging said cylinder block in said bore, said piston member having a projecting enlarged concave end portion remote from said cylinder block; a slipper member interposed between and having oppositely disposed bearing faces in engagement with said piston end and said swash plate; rod means interconnecting said piston and said slipper whereby said slipper is pivotally carried thereby, said piston member having an open passageway providing communication between said cylinder bore and said piston end for permitting the flow of lubricating fluid therethrough, said slipper member having an open passageway extending between said oppositely disposed faces for permitting flow of lubricating fluid through said slipper to said swash plate; restricted orifice means in said piston passageway and restricted orifice means in said slipper passageway whereby rate of flow of fluid through said passageways is controlled, each of said slipper faces having a recess therein whereby each bearing face provides a dam around the recess therein, the projected area of the recess in the face of said slipper engaging said swash plate being greater than the projected area of the average dam dimension in the other face, and the projected area of the recess in the latter face being greater than the projected area of the portions of said piston member in said cylinder bore whereby said lubricating fluid at all times maintains a fluid film on said oppositely disposed faces of said slipper.

References Cited in the file of this patent

UNITED STATES PATENTS

| | | |
|---|---|---|
| 2,299,235 | Snader | Oct. 20, 1942 |
| 2,604,856 | Henrichsen | July 29, 1952 |
| 2,608,159 | Born | Aug. 26, 1952 |
| 2,638,850 | Ferris | May 19, 1953 |
| 2,674,196 | Ferris | Apr. 6, 1954 |
| 2,721,519 | Henrichsen | Oct. 25, 1955 |
| 2,733,666 | Poulos | Feb. 7, 1956 |

FOREIGN PATENTS

| | | |
|---|---|---|
| 532,617 | Great Britain | Jan. 28, 1941 |